United States Patent [19]

Stenberg

[11] 3,865,085
[45] Feb. 11, 1975

[54] ROTARY ENGINE
[76] Inventor: Joseph Stenberg, Rt. 1, Box 7B, Linn Creek, Mo. 65052
[22] Filed: June 8, 1973
[21] Appl. No.: 368,335

[52] U.S. Cl................................. 123/8.33, 418/263
[51] Int. Cl............................................. F02b 53/08
[58] Field of Search ....... 123/8.17, 8.27, 8.31, 8.33; 418/263, 261, 264

[56] References Cited
UNITED STATES PATENTS

| | | | |
|---|---|---|---|
| 1,354,189 | 9/1920 | Howitt et al. | 123/8.33 |
| 1,686,532 | 10/1928 | Ronning et al. | 418/263 X |
| 1,921,782 | 8/1933 | Schaefer | 123/8.33 |
| 2,062,576 | 12/1936 | Johnson | 123/8.33 |

FOREIGN PATENTS OR APPLICATIONS

| 710,190 | 8/1931 | France | 123/8.33 |
|---|---|---|---|

Primary Examiner—G. J. Husar
Assistant Examiner—Leonard Smith
Attorney, Agent, or Firm—Schmidt, Johnson, Hovey & Williams

[57] ABSTRACT

An internal combustion engine is provided in which a cylindrical power rotor is disposed within a cylindrical housing and carries a plurality of spaced, substantially radially reciprocable valve mechanisms in the form of paddle-like vanes. The housing presents a plurality of spaced-apart chambers arranged circumferentially about the rotor and adjacent the periphery thereof; alternate chambers defining a compression chamber and a power chamber. The valve mechanisms are arranged in a plurality of pairs, each of which present a compression valve and a power valve coupled with respective stationary cam members which serve as means for controlling the shifting of the vanes outwardly from the periphery of the rotor and into and out of selected chambers according to a predetermined sequence such that a fuel intake region is defined rearwardly of the compression valve vane and a fuel compression region is defined forwardly of the vane when the valve mechanism is disposed within a compression chamber, and a fuel combustion zone is defined rearwardly of the power valve vane with an exhaust region being defined forwardly of the vane when the valve mechanism is disposed in a power chamber. The reciprocating action of the respective vanes in and out of their corresponding chambers causes the rotor to function such as a "paddle wheel" deriving its rotational, motive power from the combustion of the fuel. Further, the arrangement of the chambers with their associated fuel inlets or exhaust outlets is such that while one compression valve mechanism is compressing the fuel it is also causing fuel to be drawn into the compression chamber for subsequent compression by a second compression valve mechanism; and the power valve mechanism, against which the combustive force of the burning fuel is applied, forces out, through an appropriately located exhaust outlet, the exhaust gases which remain in the power chamber from a previous combustion cycle.

1 Claim, 8 Drawing Figures

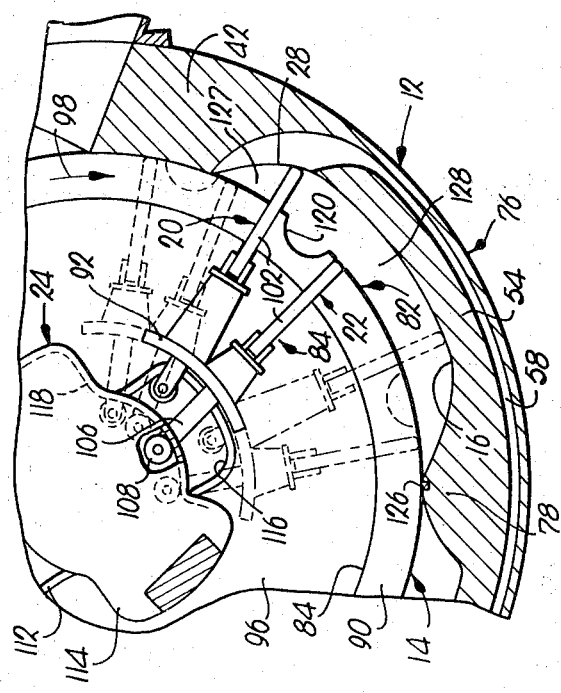
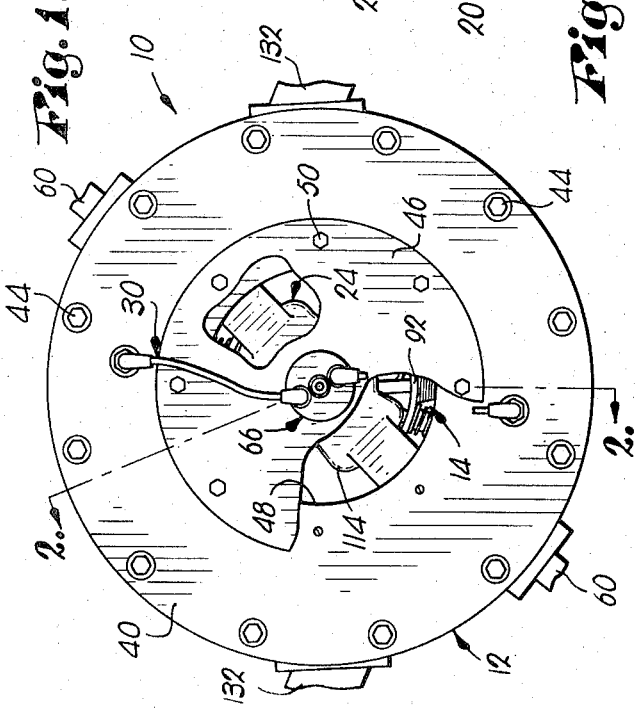
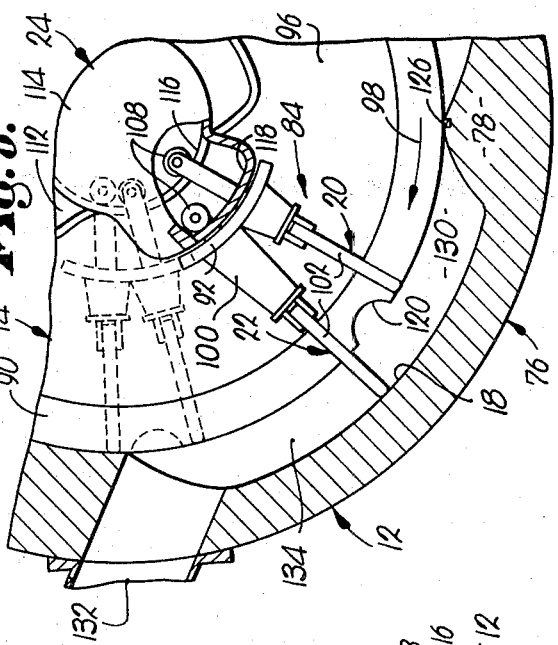
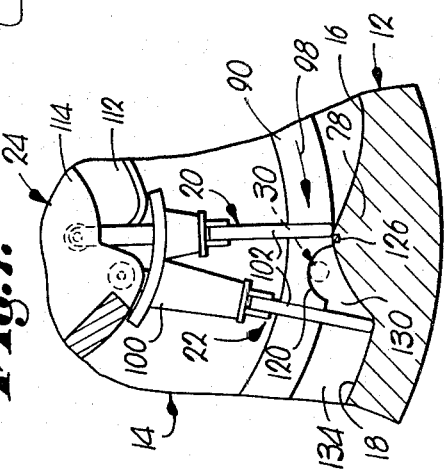
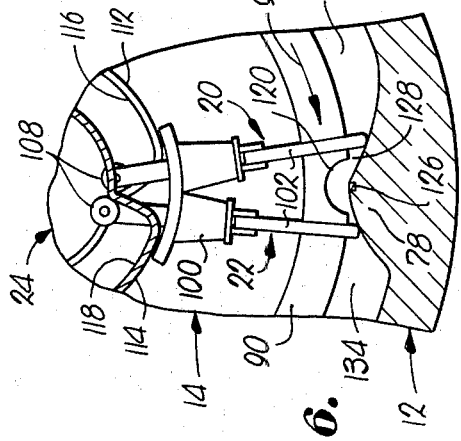

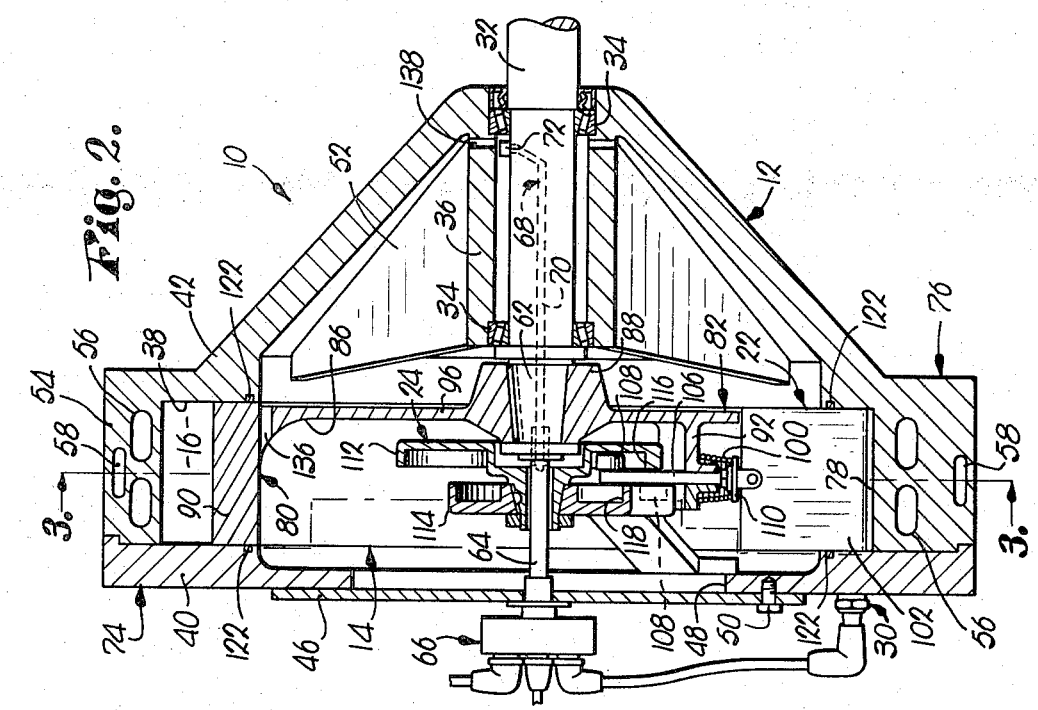
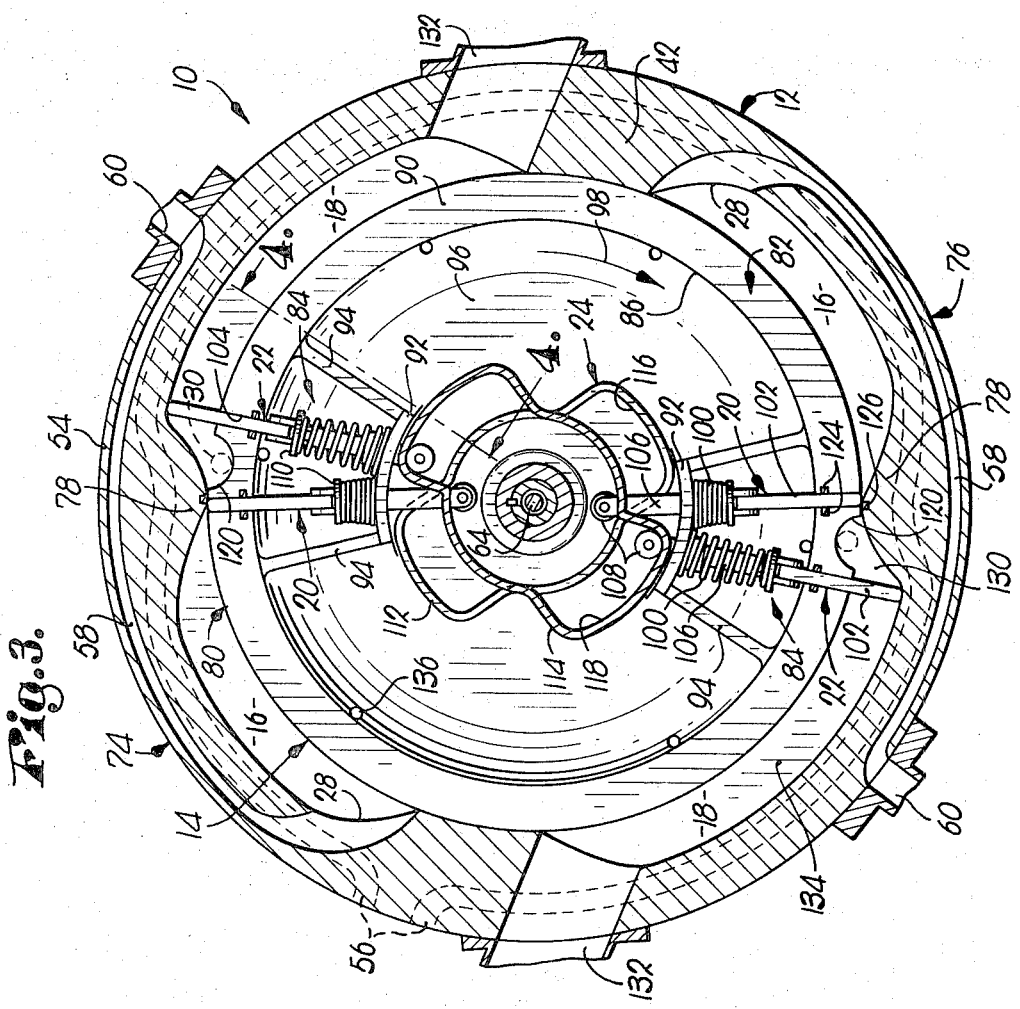

3,865,085

1

ROTARY ENGINE

This invention relates to an internal combustion engine and, more specifically, to a rotary engine in which the motive power is transferred to a power shaft through the use of a cylindrical rotor as opposed to the use of reciprocable pistons.

It is a very important object of my invention to provide a rotary internal combustion engine in which a power rotor is operably equipped with a plurality of reciprocable, vane-like sliding valves for cooperation with a plurality of alternately spaced compression and power chambers disposed circumferentially about the rotor such that the rotor and valves define a "paddlewheel" which is responsive to the combustive force of a supply of fuel and thereby transmit motive power to a shaft.

Another important object of my invention is to provide a rotary engine which is readily adaptable for use with both front or rear driven passenger automobiles, as well as with lawn mowers, garden tillers, or the like when constructed on a reduced scale.

Yet another important object of the invention is to provide a rotary engine in which the compression ratio might be easily converted and modified to increase the horsepower rating simply by the addition, substitution or modification of standard internal components.

A still further important object of the invention is to provide a rotary engine which is lightweight, contains relatively few parts, is designed to deliver a steady flow of power using lead-free, low octane fuel and which may be operated either in a horizontal disposition or a vertical disposition, depending on its application.

Another important object of the invention is to provide a rotary engine which may be easily repaired while in the vehicle without removal of the engine therefrom, and in which access is readily available to all working parts.

In the drawings:

FIG. 1 is a side elevational view of a rotary engine made pursuant to the present invention with a portion of an inspection plate partially broken away to reveal details of internal construction;

FIG. 2 is an enlarged, vertical section taken along line 2—2 of FIG. 1;

FIG. 3 is an enlarged, vertical section taken along irregular line 3—3 of FIG. 2;

FIG. 4 is a fragmentary, sectional view taken along line 4—4 of FIG. 3 showing primarily the valve adjusting rod support boss of the power rotor;

FIG. 5 is a fragmentary, vertical sectional view similar to FIG. 3 schematically showing a portion of the engine rotor and the relative positions of a pair of sliding valve mechanisms when the latter are in the vicinity of a compression chamber;

FIG. 6 is a fragmentary, cross-sectional view schematically showing the relative positions of a pair of sliding valve mechanisms at the time a fuel supply is being transferred from a compression chamber to a power chamber;

FIG. 7 is a fragmentary, cross-sectional view schematically showing the relative positions of a pair of sliding valve mechanisms at the time of fuel combustion, the relative position of the rotor to the housing being the same as that shown in FIGS. 1, 2 and 3; and FIG. 8 is a fragmentary, vertical sectional view similar to FIG. 5 schematically showing the relative positions of a pair of sliding valve mechanisms when in the vicinity of a power chamber of the engine.

A rotary engine, broadly designated by the numeral 10, is comprised of a cylindrically shaped housing 12 which encloses a cylindrically shaped rotor 14, a plurality of spaced-apart chambers 16 and 18 interiorly of the housing 12, a plurality of spaced, substantially radially reciprocable valve mechanisms 20 and 22 carried by the rotor 14, control means 24 coupled with the mechanisms 20 and 22 respectively, fuel inlets 28 at each of the chambers 16, and fuel combustion means 30 in communication with the chambers 18. The rotor or power wheel 14 is supported in the housing 12 by means of a power shaft 32 carried by bearings 34 disposed in the hub portion 36 of the housing 12.

The housing 12 presents an internal groove 38 within which the outer periphery of the rotor 14 is received and rotates, the chambers 16 and 18 forming a part of the groove 38 and arranged circumferentially about the rotor 14 and adjacent the periphery thereof. The housing 12 is separable and includes a removable access ring 40 which forms one side of the groove 38 and is releasably attached to the body 42 of the housing 12 through use of a plurality of bolt fasteners 44 as seen in FIG. 1. In addition, an inspection plate 46 closes an opening 48 in the access ring 40 and is removably attached, as by bolts 50, to the ring 40. A plurality of reinforcement gussets 52 are disposed internally of the body 42 in a manner to support and stabilize the hub 36 which carries the shaft 32. Cored into the outer circular wall 54 of the body 42 are a pair of conduits 56 disposed laterally of one another for purposes of receiving a liquid engine coolant for circulation therethrough. The wall 54 is further provided with a pair of opposed fuel passageways 58 in communication with respective compression chambers 16 at inlets 28, the external openings to the passageways 58 being identified by the numeral 60.

A tapered end 62 of the shaft 32 receives the rotor 14 in a conventional manner; there also being a distributor drive shaft 64 operably attached to the end 62 for rotation therewith and extending through the inspection plate 46 for engagement with a conventional ignition distributor assembly 66 forming a part of the combustion means 30. The shaft 32 is further provided with an engine oiler system 68 which includes a conduit 70 extending axially along a substantial length of the shaft and terminating in the distributor shaft 64 just exteriorly of the end 62 of the shaft 32 in a pair of opposed, lateral orifices. A radially extending paddle 72 is attached to the shaft 32 adjacent the inlet to the conduit 70, the operation of the oiler system 68 being more fully explained hereinafter.

The housing 12 is so constructed to present a first half section 74 disposed radially of the rotor 14 and which includes one compression chamber 16 and one power chamber 18, and a second half section 76, identical to the first half section 74, also disposed radially of the rotor 14 and opposite the first half section 74, the second half section 76 likewise having a compression chamber 16 and power chamber 18. The outer wall 54 is so constructed to present a transverse lobe 78 in approximately the center of each half section 74 and 76 interiorly of the groove 38 and extending inwardly from the wall 54 to a point adjacent the periphery of the rotor 14 in a manner to separate respective chambers 16 and 18.

The rotor 14 is symmetrically configured and presents two identical, radially opposed halves 80 and 82, each of which mounts a pair of sliding valve mechanisms 84 comprised of one compression valve 20 and one power valve 22. In configuration, the rotor 14 presents a concavity 86 such that the rotor hub 88 is axially offset relative to the outer periphery which defines an elongated wall-like flange 90 disposed parallel to the axis of rotation, this configuration best being seen by referring to FIG. 2. Projecting into this concavity 86, on each of the halves 80 and 82, is a boss 92 spaced radially from the axis of rotation and through which respective pairs of mechanisms 84 extend, there being reinforcement gussets 94 formed integrally with the bosses 92 and a disc portion 96 of the rotor 14.

The individual valves 20 and 22 are arranged in their respective pairs 84 in a fore-and-aft relative relationship with respect to the direction of rotation of the rotor 14, this direction of rotation being clockwise when viewing FIG. 2 as indicated by the arrow 98. The trailing valve 20 defines a compression valve, while the leading valve 22 defines a power valve, both of which are operably engaged by the control means 24 in a manner to continuously bias the valves 20 and 22 in an outwardly direction relative to rotor 14 through the use of individual compression springs 100. Inasmuch as the components of the respective valves 20 and 22 are identical, the components are identified by like numerals, the distinguishing characteristics of the valves being their location with respect to one another and the rotor 14. Accordingly, each valve 20 and 22 includes a paddle-like, planar vane 102 disposed transversely of the groove 38 and the chambers 16 and 18, and which reciprocate substantially radially of the axis of rotation of the rotor as defined by the shaft 32, there being corresponding slots 104 in the flange 90 in which the vanes 102 shift. Releasably coupled to each of the vanes 102 is an elongated adjusting rod 106 having a cam roller 108 rotatably affixed thereto at the end opposite the vane 102. The spring 100 is telescopically positioned over the rod 106 and is interposed between a spring retainer flange 110, located on the rod 106 adjacent the vane 102, and the boss 92 in a manner to continually bias the vane 102 in an outward direction relative to the rotor 14.

The control means 24 includes a first stationary cam member 112 attached to and being a part of the access ring 40, and a second stationary cam member 114 which is, in turn, releasably affixed to and carried by the first cam member 112 (best shown in FIG. 2). The cam members 112 and 114 are located substantially centrally of the housing 12 and the rotor 14, and axially aligned with the shaft 32. The configurations of the cam members 112 and 114 are so arranged that the rollers 108 of the respective valve mechanisms 20 and 22 are positioned intermediate the respective stationary cam surfaces 116 and 118 of the members 112 and 114 and the axis of rotation of the rotor 14, the springs 100 serving to maintain the rollers 108 in engagement with the surfaces 116 and 118. It is to be further noted that the cam surfaces 116 and 118 are axially spaced from one another to permit passage of the rods 106 therebetween as they rotate with the power wheel 14. The particular arrangement of the valves 20 and 22, as well as the control means 24 with its two cam members 112 and 114, can best be seen by again referring to FIG. 2. Further, reference to FIG. 3 will reveal that the paths of travel of the rollers 108 defined by the cam surfaces 116 and 118 correspond to the arrangement of the chambers 16 and 18 such that the vanes 102 of the respective mechanisms 20 and 22 are permitted to shift into the corresponding chambers according to a predetermined sequence.

A transverse, semicircular channel 120 is located in the rotor 14 at the outer circumferential edge of the flange 90 intermediate the respective vanes 102 in each of the pairs of mechanisms 84. Also, conventional sealing rings 122 are provided in the body 42 and the access ring 40 to prevent the escape of fuel and gases from the chambers 16 and 18, there also being sealing means 124 disposed in the flange 90 for cooperation with the sliding vanes 102. Additional sealing means 126 are provided in the apexes of the lobes 78 adjacent the flange 90 to prevent the transfer of fuel and gases between the adjacent chambers 16 and 18 except at those times when the channels 120 are passing directly thereover.

In operation, the engine 10 is started in the normal manner of any internal combustion type engine such that the rotor 14 is caused to turn in the direction of the arrow 98, and in so doing, vaporized fuel is metered into the respective passageways 58 by means of carburetors (not shown) for subsequent introduction into the compression chambers 16 through corresponding inlets 28. As the rotor 14 turns, the valves 20 and 22 move along their circular paths of travel. During the course of travel, the shape of the cam member 112 permits the springs 100 of the valves 20 to shift their corresponding vanes 102 outwardly from the flange 90 of the power wheel 14 and into the adjacent chambers 16 during the time that the power wheel 14 is carrying the valves 20 past the chambers. This action can best be seen by referring to FIG. 5 wherein the movement of the rotor 14, as well as the valves 20 and 22, is shown with the solid lines illustrating the vane 102 of the compression valve 20 in a position of having just entered a compression chamber 16 in the vicinity of its fuel inlet 28 while the dotted lines illustrate the positions of this same vane 102 of the valve 20 just prior to the entry of the valve 20 into the chamber and a subsequent position of the valve 20 just prior to its exiting from the chamber.

It is to be noted that the vanes 102 of the power valves 22 remain retracted and do not project into the compression chamber 16 during the time the valve mechanisms 22 are in the vicinity of a compression chamber 16 by virtue of the configuration of the cam member 114. As the valve 20 moves through the chamber 16, the area rearwardly of the vane 102 defines an expanding fuel intake region, identified by the numeral 127, into which the fuel is drawn by virtue of the vacuum created by the vane 102, while the area forwardly of the vane 102 defines a fuel compression region, identified by the numeral 128, which becomes progressively smaller as the valve 20 moves through the chamber 16. The fuel drawn into the intake region 127 remains in the chamber 16 for subsequent compression by the next succeeding compression valve 20 to enter the chamber 16.

The fuel in the compression region 128 is increasingly compressed as the vane 102 approaches the lobe 78 until such time as the channel 120 permits the transfer of the now highly compressed fuel from the compression chamber 16 to the power chamber 18 by virtue of the clearance afforded by the channel 120 adjacent the lobe 78. It is at this point that the combustion means 30 of the engine causes the compressed fuel to be ignited, the relative position of the rotor 14, with its valves 20 and 22, with respect to the chambers 18 at the time of combustion being best seen in FIGS. 3 and 7. It is to be noted that the vane 102 of the compression valve 20 has now been fully retracted while the vane 102 of the power valve 22 has now been projected into its power chamber 18 such that the area rearwardly of the vane 102 defines an expanding combustion zone 130 as the valve 22 moves through the chamber 18 in a direction away from the corresponding lobe 78 and toward an exhaust outlet 132 at the opposite end of the chamber 18; the area forwardly of the power valve 22 defining an exhaust region 134 which becomes progressively smaller with the passing of the vane 102 through the chamber 18.

The exhaust gases in the region 134 are those gases that remained in the chamber 18 from the combustion that occurred previously in that particular chamber 18. In other words, the compression valve 20 of the pair of mechanisms 84 disposed on the half of the rotor 14 identified by the numeral 80 serves to draw a supply of fuel vapor into one of the chambers 16 for the compression valve 20 of the pair of mechanisms 84 carried by the rotor half 82 to compress when it reaches that particular chamber, the valve 20 in the rotor half 82 likewise drawing a charge of fuel into its corresponding chamber 16 for subsequent compression by the valve 20 carried by the rotor half 80. A similar sequence of events occurs with respect to the power valves 22 and their corresponding chambers 18 wherein the exhaust gases remaining in the chambers after the ignition of the prior charge of the fuel are forced to exit via the outlets 132 when the opposite power valve 22 was in that particular chamber. In this manner, each pair of mechanisms 84 charges a chamber 16 for the opposing pair of mechanisms 84 to compress, while at the same time purging a chamber 18 after the opposing pair had passed thereby.

The oiler system 68 adequately lubricates the relatively few working parts of the engine by virtue of the paddle 72 picking up the oil and forcing it through the passageway 70 in the shaft 32 to be ultimately flung outwardly from the orifices to lubricate the rollers 108 as they travel about the surfaces 116 and 118. The centrifugal action caused by the rotary motion of the valve mechanisms 20 and 22 along with the rotor 14 tends to throw the oil outwardly toward the vanes 102 after which the oil will find its way through the holes 136 in the disc 96 of the rotor 14 for subsequent return to the vicinity of the paddle 72, there being openings 138 provided in the hub 36.

The simplicity of construction can best be illustrated by the fact that complete service and maintenance, as well as the replacement of working parts, can be accomplished without removal of the engine from the vehicle. By merely removing the exposed inspection plate 46 or, in the case of major overhaul, the additional removal of the access ring 40, the entire rotor and its working parts as well as the cam members 112 and 114 are fully exposed and accessible. In this connection also, the engine is not limited to being oriented in any one particular position but may be used either horizontally or vertically and is, therefore, readily adaptable for use in any number of applications such as lawn mowers, rotary tillers and the like.

Further, and perhaps more significantly, the manner in which the engine is constructed lends it to being readily modified or altered as required for the particular application in which it is to be used simply by the addition or deletion of valve mechanisms 84 to increase or decrease the horsepower rating of the engine. When more pairs of valves 84 are provided there is no need for additional controlling means 24 in that these extra pairs of valves would be alternately spaced with the existing pairs of valves and would be controlled by the same cam members 114 and 112. Of course, it is to be understood that a different rotor 14 would have to be furnished that had the correct number of bosses 92 along with corresponding slots 104 in the flange 90. As an alternate, if more power is required, the diameter of the housing, as well as the rotor, could be increased to provide larger chambers in much the fashion that a reciprocating piston engine is provided with a larger cylinder bore. Of course, additional pairs of valve mechanisms 84 may also be added. The compression of the engine can be easily changed by modifying the configuration of the lobes 78 to increase or decrease the area of the combustion zone 130 when the rotor is in the position shown in FIGS. 3 and 7, which is the precise time that firing takes place.

From the foregoing description it will be readily apparent that a novel rotary engine has been herein disclosed in which the efficiencies of a "paddle wheel" have been incorporated as part of an internal combustion engine. Of course, the greatest benefit becomes readily apparent when it is noted that the power is imparted strictly by a rotating member and there is no need to convert a reciprocable motion to a rotary motion as is the case in a conventional piston-type internal combustion engine.

Having thus described the invention, what is claimed as new and desired to be secured by Letters Patent is:
1. A rotary engine comprising:
a cylindrical, dished rotor having a central hub axially offset to one end thereof;
a housing enclosing said rotor and presenting a plurality of spaced-apart chambers arranged circumferentially about said rotor and adjacent the periphery thereof,
alternate ones of said chambers defining a compression chamber having a fuel inlet and a power chamber having an exhaust outlet, said rotor being mounted on a shaft journalled in said housing for rotation therein;
at least one pair of spaced, substantially radially reciprocable sliding valve mechanisms carried by said rotor and transversely disposed in a fore-and-aft relative relationship with respect to the direction of rotation of said rotor with a first one of said valve mechanisms defining a compression valve for cooperation with said compression chamber and a second one of said valve mechanisms defining a power valve for cooperation with said power chamber,
each valve mechanism including a paddle-like vane transversely disposed relative to said chambers, a rod having an outer end to which a said vane is affixed and spring means operably coupled with said rod for biasing the vane in an outward direction relative to the periphery of said rotor;
control means carried by said housing and operably coupled with said valve mechanisms for controlling the shifting movements of said vanes into and out of corresponding ones of said chambers in a predetermined sequence, said control means including:
a first stationary cam member supported by said housing interiorly thereof for controlling the reciprocable movement of said power valve and a second stationary cam member secured to and supported by said first cam member for controlling the reciprocable movement of said compression valve;

a cam follower secured on each valve mechanism rod at an inner end thereof opposite a corresponding vane with said spring means being disposed between the vane and the cam follower, said cam members being perpendicularly positioned and axially aligned relative to the axis of rotation of the rotor and located within said housing in a disposition substantially centrally of the concavity presented by said dished rotor, each cam member presenting a flanged segment having a continuous inner surface facing the axis of rotation of said rotor and along which a corresponding cam follower travels in uninterrupted engagement therewith, said flanged segments being axially spaced apart in an opposed, oppositely facing relationship relative to each other with the valve mechanism rods passing between the opposed flanged segments during revolution of the rotor and reciprocating along respective paths of travel that are in a common plane normal to the axis of rotation and is substantially centrally disposed relative to the axial length of said rotor and the width of said vanes, each of said surfaces having a configuration arranged to permit radially reciprocable movement of its associated valve mechanism to shift the vane thereof into and out of its corresponding chamber according to a predetermined sequence and in response to the biasing action of its spring means as the rotor revolves; and fuel supply means and fuel combustion means operably associated with respective ones of said chambers for cooperation with said valve mechanisms whereby a driving force is imparted to said rotor when combustion takes place.

* * * * *